(12) United States Patent
Walters

(10) Patent No.: US 9,065,873 B2
(45) Date of Patent: Jun. 23, 2015

(54) REDUCTION OF CHAINING IN CONFERENCE SESSIONS

(71) Applicant: Cisco Technology, Inc., San Jose, CA (US)

(72) Inventor: Malcolm Walters, Abingdon (GB)

(73) Assignee: Cisco Technology, Inc., San Jose, CA (US)

( * ) Notice: Subject to any disclaimer, the term of this patent is extended or adjusted under 35 U.S.C. 154(b) by 176 days.

(21) Appl. No.: 13/654,651

(22) Filed: Oct. 18, 2012

(65) Prior Publication Data

US 2014/0112211 A1  Apr. 24, 2014

(51) Int. Cl.
| | |
|---|---|
| *H04L 12/18* | (2006.01) |
| *H04L 29/06* | (2006.01) |
| *H04M 3/56* | (2006.01) |
| *H04M 3/36* | (2006.01) |

(52) U.S. Cl.
CPC ........... *H04L 65/4038* (2013.01); *H04M 3/567* (2013.01); *H04M 2203/5009* (2013.01); *H04L 12/1822* (2013.01); *H04M 3/367* (2013.01); *H04M 3/562* (2013.01); *H04M 2203/5045* (2013.01); *H04L 65/80* (2013.01)

(58) Field of Classification Search
None
See application file for complete search history.

(56) References Cited

U.S. PATENT DOCUMENTS

| 7,456,858 B2 | 11/2008 | Schrader et al. | |
|---|---|---|---|
| 8,077,852 B1 | 12/2011 | Das et al. | |
| 8,218,458 B2 | 7/2012 | Flynn et al. | |
| 2008/0165245 A1* | 7/2008 | Sarkar et al. | 348/14.09 |
| 2009/0093240 A1* | 4/2009 | Lang | 455/416 |
| 2010/0165889 A1 | 7/2010 | Madabhushi et al. | |
| 2012/0069983 A1 | 3/2012 | Sall | |
| 2013/0162753 A1* | 6/2013 | Hendrickson et al. | 348/14.08 |
| 2013/0173706 A1* | 7/2013 | Broadworth et al. | 709/204 |
| 2013/0336170 A1* | 12/2013 | Broadworth et al. | 370/260 |

OTHER PUBLICATIONS

International Search Report and Written Opinion in counterpart International Application No. PCT/US2013/064945, mailed Jun. 6, 2014, 9 pages.

* cited by examiner

*Primary Examiner* — Awet Haile
(74) *Attorney, Agent, or Firm* — Edell, Shapiro & Finnan, LLC

(57) ABSTRACT

Techniques are provided for adding a participant at an end point device to an ongoing conference session. An ongoing conference session is established, where the conference session includes a communication between a plurality of endpoint devices, and a bridging device facilitates a connection between at least some of the endpoint devices engaging in the conference session. At least one communication message is provided from the bridging device to a communications manager device associated with the conference session, where the at least one communication message provides identification information associated with the bridging device and the conference session. The ongoing conference session is extended to an additional participant's endpoint device, where the additional endpoint device is connected with the ongoing conference session utilizing the bridging device and based upon the conference session information obtained from the at least one communication message.

26 Claims, 28 Drawing Sheets

REDUCTION OF CHAINING IN CONFERENCE SESSIONS

TECHNICAL FIELD

The present disclosure relates to audio and/or video conferencing and adding participants to an existing conference.

BACKGROUND

During conference sessions involving audio and/or video communications between participants at two or more end points, under certain instances it is necessary to add another participant at a further end point to the existing, ongoing conference. This could be due to a number of reasons (e.g., the conversation flows in a direction in which another participant is needed).

When it is desired to add another participant to a conference session, a current participant (i.e., a participant already within the ongoing conference session) often must add the new participant to the conference. This is typically performed by the current participant placing the conference session on hold at that participant's end point, connecting with the new participant, and then attempting to add the new participant to the conference. However, based upon certain conditions associated with the conference (e.g., if a participant of the conference who wants to add another participant did not originally initiate the conference session), this procedure may generate a chained conference, where the new participant is placed into a new conference session that is linked to the original, ongoing conference session.

Thus, the chaining that typically occurs when adding participants to conference sessions results in a greater number of conference ports/MCUs required for connecting new participants to the original or existing conference. In addition, this can reduce the quality of user experience within the conference session and also result in wasted bandwidth utilization.

DESCRIPTION OF EXAMPLE EMBODIMENTS

Overview

Figure 1A:
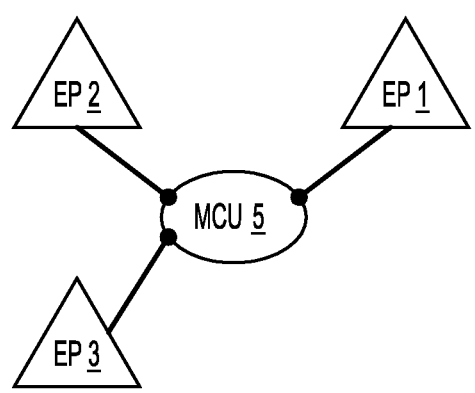
FIGS. 1A-1C are schematic diagrams showing a typical system architecture in which a new participant is added to an existing conference session by chaining a newly created conference session with the existing conference session.

Techniques are provided for adding a participant at an end point device to an ongoing conference session. An ongoing conference session is established, where the conference session comprises a communication between a plurality of endpoint devices, and a bridging device facilitates a connection between at least some of the endpoint devices engaging in the conference session. At least one communication message is provided from the bridging device to a communications manager device associated with the conference session, where the at least one communication message provides identification information associated with the bridging device and the conference session. The ongoing conference session is extended to an additional participant's endpoint device, where the additional endpoint device is connected with the ongoing conference session utilizing the bridging device and based upon the conference session information obtained from the at least one communication message.

Example Embodiments

Techniques are described herein for adding a participant to an existing/ongoing conference session while reducing chaining between different bridging devices, since the new participant is added to the original conference (instead of being linked via a new conference session to the existing or ongoing conference session). This is achieved by providing information within communication messages between one or more bridging devices and one or more communications manager devices associated with the ongoing conference session, where specific information is provided about a bridging device utilized to connect participants via their endpoint devices and also specific information relating to the ongoing conference session. Based upon the specific information received by a communications manager device about the bridging device that connects participants within the conference session, it can be determined whether the bridging device can be controlled by the communications manager device so as to extend the ongoing conference to the additional participant utilizing the bridging device.

As previously noted, adding another participant to an existing or ongoing conference session in typical conferencing configurations requires a current participant (i.e., a participant already within the ongoing conference session) to add the new participant to the conference. This is typically performed by the current participant placing the conference session on hold at that participant's end point, connecting with the new participant, and then attempting to add the new participant to the conference. However, based upon certain conditions associated with the conference (e.g., if a participant of the conference who wants to add another participant did not originally initiate the conference session), this procedure may generate a chained conference, where the new participant is placed into a new conference session that is linked to the original, ongoing conference session. This is depicted in the embodiment of FIGS. 1A-1C.

Figure 1B:
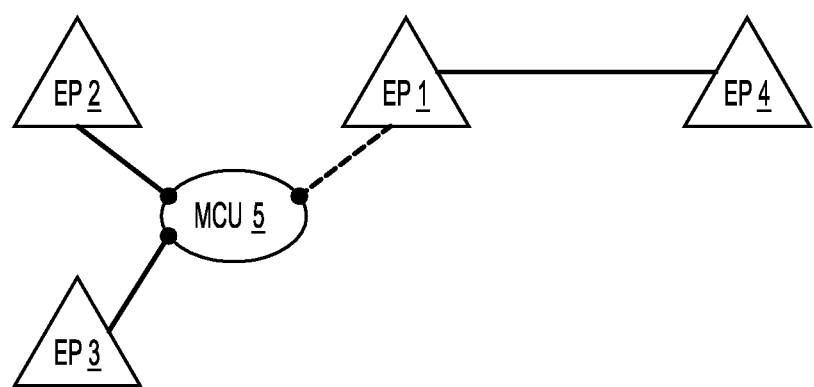
Figure 1C:
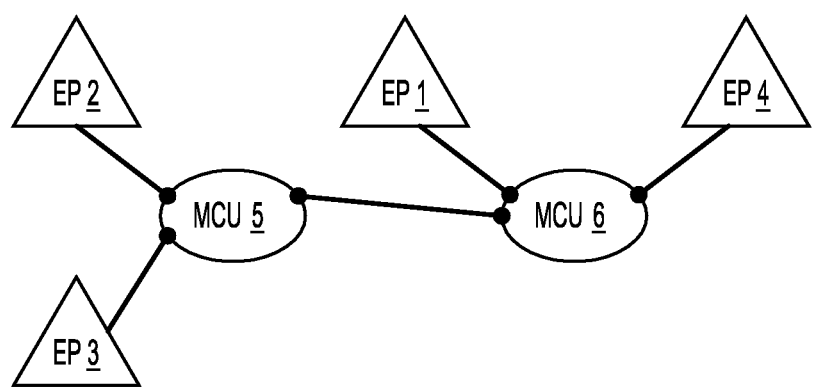

Referring to FIG. 1A, an original, ongoing conference between endpoint devices 1, 2 and 3 occurs utilizing a multipoint control unit (MCU) 5, where endpoint device 1 did not initiate the conference session (e.g., the conference session was initiated by one of the other endpoint devices or was established by a call-in meeting invitation to all endpoint devices) When it is desired to add another participant to the ongoing conference at endpoint device 4, the conference session may be configured to permit a participant to add a new participant. For example, a participant at endpoint 1 (utilizing the participant's communication device, such as a phone or computing device), activates a conference function (e.g., by pressing a conference key) and calls the participant at endpoint 4, as shown in FIG. 1B (in which the dashed line between endpoint 1 and MCU 5 indicates a hold connection for the endpoint 1 within the conference session). The participant at endpoint 1 connects with the new participant at endpoint 4, and then activates the conference function again (e.g., by pressing the conference key). This results in a new conference between endpoint devices 1 and 4 hosted on a second MCU 6 which is chained to the original conference hosted on MCU 5, as shown in FIG. 1C.

As previously noted, the chaining that typically occurs when adding participants to conference sessions results in a greater number of conference ports/MCUs required for connecting new participants to the original or existing conference. In addition, this can reduce the quality of user experience within the conference session and also result in wasted bandwidth utilization.

In accordance with devices and techniques described herein, the additional participants can be added to existing or ongoing conferences while minimizing or avoiding any chaining of the additional participants within the conference session. Example embodiments of conference sessions with which the techniques described herein can be applied include audio calls as well as video conferencing sessions between multiple participants, where each participant is located at an endpoint device that may be remote from one or more other endpoint devices engaged within the ongoing conference session. Conference sessions can occur in an environment in which participants are invited to join a conference, e.g., by calling into a call/conference number (and optionally providing user identification and password information). In this environment, a new participant can join the conference by calling into the conference number. Conference sessions can also occur when a participant initiates a conference session utilizing a conferencing function or feature on the endpoint device of the participant (e.g., a conference button on a phone). Any participant currently engaged in the ongoing conference session can conference a new participant into the session. However, as previously noted, this can lead to chaining issues, in which one or more additional multipoint control units (MCUs) may be needed to extend the conference session to the new participant(s) (particularly in scenarios in which the UCM currently hosting the ongoing conference session is not aware of which bridge to use to connect with the new participant).

The techniques described herein are particularly suitable for application in unified communications (UC) environments, in which a variety of real-time communication services including, without limitation, audio calls and audio conferencing such as telephony (including IP telephony), video calls and video conferencing, instant messaging, unified messaging (e.g., voicemail, email, SMS and fax), providing presence information for participants, data sharing (including sharing of files, blogs, whiteboards, etc.), are integrated within a single platform. A UC platform can include one or more manager devices operating as host servers for participant end devices, where the UC manager devices support the communication services (e.g., the participant end devices communicate via the UC manager devices). Some example of UC platforms which utilize UC manager devices include, without limitation, a Cisco Unified Communications Manager platform (Cisco Systems, Inc.), IBM Sametime (IBM Corporation), Microsoft Lync Server (Microsoft Corporation), etc.

Figure 2:
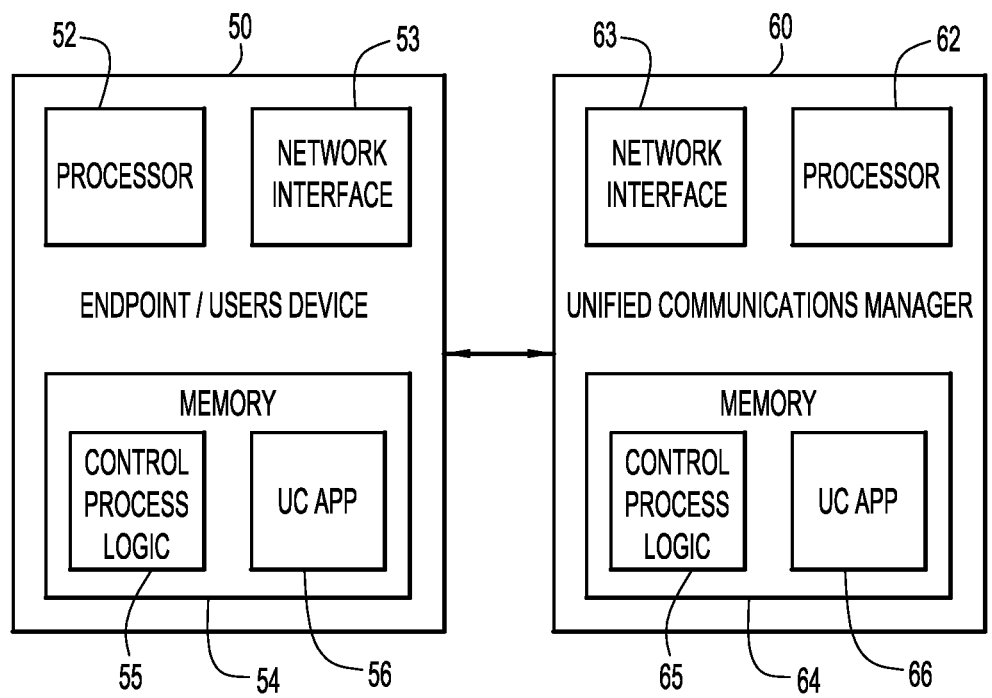
FIG. 2 is a schematic block diagram of an example embodiment of a configuration for each of an end point/client device and a unified communications manager for use in the system architecture depicted by FIGS. 3A-3C.

The end point devices and communications manager devices comprise computing devices that are configured to communicate and exchange information with each other. An example embodiment is depicted in FIG. 2 of an endpoint device and a unified communications manager (UCM) device that can be utilized for performing techniques as described herein. The end point device 50 includes at least one processor 52, a network interface 53, and a memory 54. Similarly, the UC manager device 60 includes at least one processor 62, a network interface 63, and memory 64. Each of the processors 52, 62 can be implemented, for example, as a microprocessor, microcontroller, system on a chip (SOCs), or other fixed or programmable logic. The functions of the processors 52, 62 may each be implemented by a processor or computer readable tangible (non-transitory) medium encoded with software comprising control process logic instructions 55, 65 stored within the memories 54, 64 of the devices 50, 60. The control process logic instructions 55, 65 include operational instructions executed by the processors to perform the techniques described herein.

The network interfaces 53, 63 of the devices 50, 60 can be, for example, one or more of an Ethernet interface card or switch, a modem, a router or any other suitable hardware device that facilitates a wireless and/or hardwire connection over a network with other computing devices (e.g., other endpoint devices and/or other UC communications manager devices), where each network interface unit can be integrated within the device or a peripheral that connects with the device.

The memories 54, 64 for the devices 50, 60 can be implemented by any conventional or other memory or storage device, and may include any suitable storage capacity. For example, each memory 54, 64 may comprise read only memory (ROM), random access memory (RAM), erasable programmable read-only memory (EPROM), magnetic disk storage media devices, optical storage media devices, flash memory devices, electrical, optical, or other physical/tangible memory storage devices. The memory 54, 64 may comprise one or more computer readable storage media (e.g., a memory device) encoded with software comprising computer executable instructions as described herein such that, when the software is executed (by processor 52, 62), it is operable to perform the operations as described herein.

The endpoint device 50 can be the same or similar for each participant/endpoint as described herein and can be any conventional or other computing device, such as a thin client, computer terminal or workstation, personal desktop computer, laptop or netbook, tablet, cellular phone, or other device capable of acting as a client in the described system. The endpoint device can be used alone, or in conjunction with an optional telephony device, which may be, for example, a telephony headset, plain old telephone system (POTS) device, cellular phone, private branch exchange (PBX) device, or any other suitable telephony device.

Each UCM device 60 can be, for example, a computing blade, a blade server comprising one or more solid state drives, or a blade center comprising one or more blade servers together with a blade chassis comprising common resources such as networking connections, input/output device connections, power connections, cooling devices, switches, etc. Each UCM device can further be a component of a larger system, such as a Cisco Unified Computing System, or a data center that centralizes enterprise computing resources. Thus, it is noted that each UCM device described by the embodiments herein can be a single device (e.g., a single server) or a combination of two or more devices (e.g., a plurality of servers) that perform hosting features for various types of communications and exchange of information and data between endpoint devices.

Each endpoint device can further include any suitable input and output devices including, without limitation, a display (e.g., an LCD screen or monitor), keyboards, mouse devices, cameras, microphones, touch screens, track pads, remote control devices, headphones, speakers, etc., to facilitate input, output or display of audio, video and/or other types of information to the user by the client device during conference sessions as well as other during use of other applications for the endpoint devices. The input/output devices can communicate with each endpoint device in any suitable manner, (e.g., via a wired or wireless connection).

The memory 54 of each endpoint device 50 includes a unified communications (UC) application module 56 comprising one or more software applications utilized by the processor(s) 52 to perform operations within a UC platform hosted by one or more UCM devices 60, including establishing connection configurations with UCM devices 60 and/or other endpoint devices as well as engaging in various communication services hosted by the UC platform. Each UCM device 60 also includes a UC application module 66 comprising one or more software applications utilized by the processor(s) 62 to perform various hosting functions within the UC platform for facilitating various types of communications and exchange of information between endpoint devices as well as performing the techniques for adding participants to an existing or ongoing conference session without the creation and chaining of additional conference sessions and additional bridging devices as described herein.

The UCM devices 60 communicate with endpoint devices 50 over a network (e.g., any one or more of local or wide area networks, Internet Protocol (IP) networks such as intranet or internet networks, telephone networks including switched telephone networks or PSTNs, wireless or mobile phone or cellular networks, and any suitable combinations thereof), where any suitable hardware and/or software can be utilized within the network to facilitate communication of information between devices over the network. Examples of hardware that can be utilized within the network include, without limitation, routers, hubs, switches, media gateways or bridging devices, or any other suitable components in any suitable form or arrangement. In particular, bridging devices, such as multipoint control units (MCUs) (e.g., MCUs 5 and 6 as depicted in FIG. 1) for video conferencing communications, are required to establish connections between three or more endpoint devices within the same conference session. An MCU typically includes a multipoint controller and one or more multipoint processors that enable bridging between three or more endpoint devices. A UCM device 60 communicates with one or more MCUs to establish a connection between endpoint devices requesting a conferencing session with each other. An MCU can further include one or more suitable software applications that facilitate establishing a conference session between endpoint devices as well as add additional endpoint devices to the ongoing conference session according to the techniques described herein.

In typical UC platforms, a UCM device can determine which participant/endpoint device may be escalating a conference session (e.g., by requesting the addition of another participant) as well as the existing participant/endpoint devices currently engaged in an ongoing conference session. However, in scenarios in which an engaged participant within an ongoing conference selects to add a new participant via a conference feature associated with the engaged participant's endpoint device, a UCM device typically cannot determine whether additional endpoint devices (e.g., endpoint devices not registered with the UCM device) can be added to an existing or ongoing conference and further does not have information regarding the ongoing conference itself (e.g., which conferences are being facilitated by which bridging device). Thus, when an additional participant is to be added to a conference session being facilitated by one MCU, the additional participant is added to a new conference session chained with the existing conference session and utilizing another MCU (i.e., as generally depicted in FIGS. 1A-1C, in which MCU 5 and MCU 6 are required to chain endpoint device 4 into the conference session between endpoint devices 1, 2 and 3).

Figure 3A:
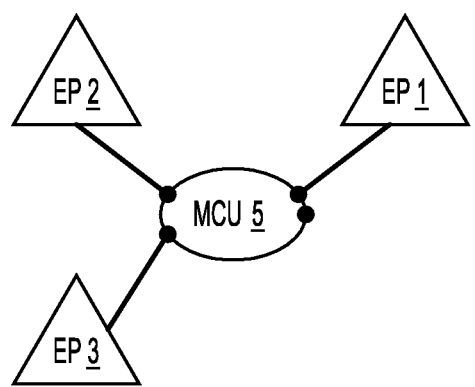
FIGS. 3A-3C are schematic diagrams showing an example system architecture in which a new participant is added to an existing conference session by bridging the new participant to the existing conference session via the same multipoint control unit.
Figure 3B:
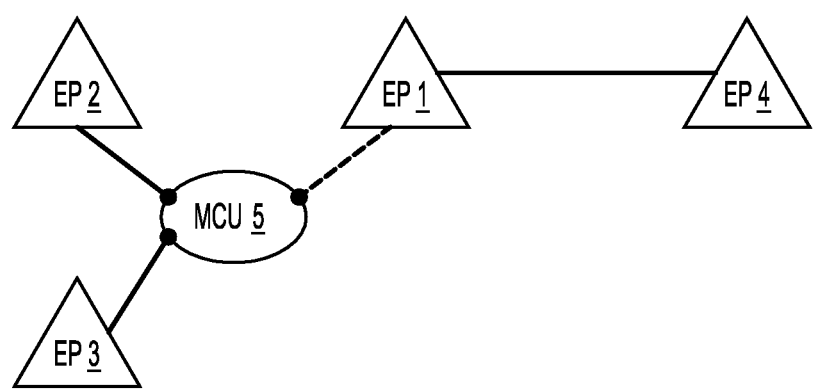
Figure 3C:
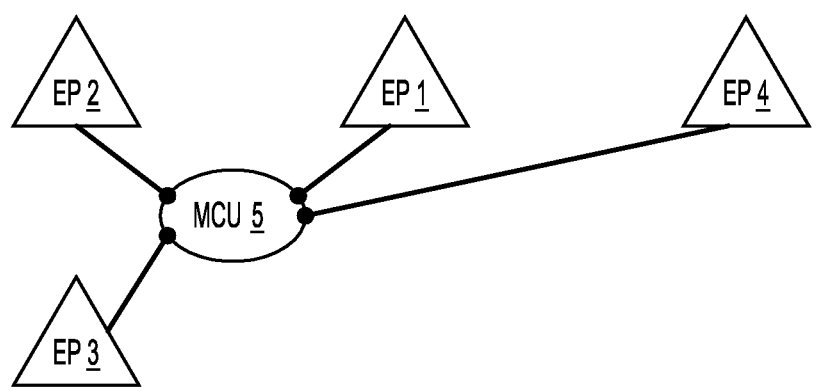

The techniques as described herein reduce the creation and chaining of additional conferences when adding one or more participants to an existing/ongoing conference session (e.g., a conference session that has been created using a conferencing feature on an endpoint device of a participant or by all participants calling into the same conference session) by providing one or more UCM devices associated with the existing conference session with identifier information about the MCU facilitating the conference session as well as identifier information about the conference session itself that is enabled by the MCU. This allows the one or more UCM devices to control the MCU handling the conference session so as to add another participant/endpoint device to the ongoing conference session via the same MCU. For example, as generally depicted in FIGS. 3A-3C, an ongoing conference session occurs between endpoints 1, 2 and 3 (FIG. 3A). When endpoint device 1 initiates the addition of another endpoint device 4 to an ongoing conference session between endpoint devices 1, 2 and 3 (e.g., by pressing a conference key function at the endpoint device 1 and calling endpoint device 4, as depicted in FIG. 3B, where a dashed line between MCU 5 and endpoint device 1 is shown as endpoint device 1 calls endpoint device 4), a UCM device hosting some or all of the conference session and having information about MCU 5 and also information about the ongoing conference session can redirect endpoint device 4 into the ongoing conference session via MCU 5 (as depicted in FIG. 3C), thus avoiding the need for additional MCUs and the creation and chaining of two or more conference sessions together, as shown in the embodiment of FIGS. 1A-1C.

The identifier information for MCUs and conference sessions can be provided to a UCM device as headers within API (Application Program Interface) and/or SIP (Session Initiation Protocol) messages exchanged between a UCM device and an MCU handling an ongoing conference session between endpoint devices. The MCU identifier information can be provided to a UCM device in any suitable manner and at any point in time prior to conference sessions occurring, since this provides a discovery mechanism for the UCM device to identify MCUs that may be associated with endpoints for conference sessions. In an example embodiment, a bridge identifier can be provided from an MCU to a UCM device in an XML-RPC API header and/or in one or more SIP messages to provide the UCM device with information regarding which bridge it controls for a conference session. Similarly, conference identifier information can also be provided from an MCU or one of the endpoint devices (e.g., an endpoint device that is requesting to add another participant to the ongoing conference session) to the UCM device in an XML-RPC API header and/or in one or more SIP messages so as to provide information to the UCM device regarding the specific conference session to access at an MCU when adding another endpoint device to the ongoing conference session. It is further noted that any one or more other suitable protocols can also be used to provide bridge identifier and/or conference identifier information between UCM devices, bridging devices and/or endpoint devices including, without limitation, XMPP and H.233 protocols.

Figure 4:
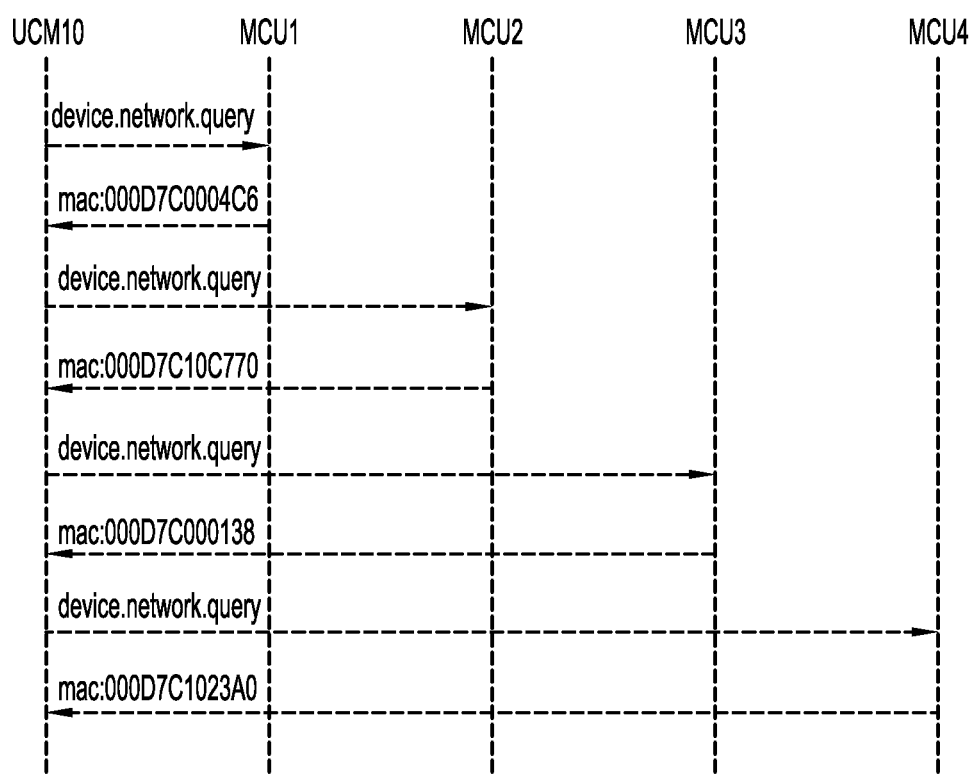
FIG. 4 is a diagram depicting an example embodiment of a flow of dialogs including communication messages between a unified communications manager device and a plurality of multipoint control units in order to obtain unique identifiers of each multipoint control unit.

An example embodiment showing a flow of communication messages between a UCM device and a plurality of MCUs in order to obtain unique identifiers of each MCU is depicted in FIG. 4 and also the Table provided below:

TABLE

Bridge Identifier Information Collected From MCUs

| Bridge | IP Address | Username | Password | MAC |
| --- | --- | --- | --- | --- |
| MCU1 | 10.2.1.100 | system | s!stem@1 | 000D7C0004C6 |
| MCU2 | 10.47.200.132 | admin | temp | 000D7C10C770 |
| MCU3 | 192.1.1.1 | root | h@llo | 000D7C000138 |
| MCU4 | 10.47.197.38 | bridge1 | Bridge!!1 | 000D7C1023A0 |

Referring to FIG. 4, the UCM device can send query messages within dialogs with any suitable number of MCUs associated with the UCM device (e.g., a UCM device sends device.network.query messages to each of MCU1, MCU2, MCU3 and MCU4) for unique bridge identifier information. Such queries are part of the MCU discovery process with which the UCM device engages prior to hosting active conference sessions in order to facilitate identification of which MCU(s) may be associated with a particular conference session. Each MCU returns its unique bridge identifier information in a message to the UCM device which can then be saved by the UCM device (e.g., in tabular form as shown in the table above). As shown in the example embodiment of FIG. 4, the unique bridge identifier information can comprise the MAC (Media Access Control) address for each MCU. Other types of information that are provided by each MCU and stored by the UCM device (in order for the UCM device to connect with the MCU) include the IP address indicating where each MCU is located, and the username and password for the MCU to enable access and control of the MCU by the UCM device. In particular, when the UCM device has username and password information in addition to its unique identifier (e.g., MAC address), the UCM device can control the MCU so as to enable adding another participant/endpoint device to an existing or ongoing conference session when the request is made by an endpoint device to add the new participant. Other optional information that could be provided by an MCU to the UCM device includes, without limitation, the hostname and serial number associated with the MCU.

When a conference session is initiated, a unique identifier corresponding with the conference session can be provided in a message from the MCU providing the conference bridge to each UCM device connected with the conference session. Alternatively, an endpoint device requesting to add another participant can send the unique identifier of the conference session and the MCU handling the conference session to a UCM device in order to provide the UCM device with information regarding where the ongoing conference session is being carried out (i.e., which MCU is handling the session) and also the specific identifier of that conference session (i.e., identifying the specific conference session at the MCU where an endpoint device is to be added).

In an example embodiment, consider an endpoint device that is in a conference session and initiates a request to add another participant to the session (e.g., by utilizing a conference key or other conferencing feature associated with the endpoint device). An SIP contact message provided to the UCM device can include header information such as the following: Contact: <sip:user@host; transport=tls; bridge=000D7C0004C6; conf=CONFERENCE1. The information in this message provides the unique bridge identifier which identifies the MCU (MCU1) and also the unique conference identifier (CONFERENCE1) that identifies the specific conference enabled by the MCU and to which the additional participant/endpoint device is to be added. With this information, the UCM device can determine whether the identified MCU is one which can be controlled by the UCM device (e.g., by matching the unique identifier for the MCU with information collected by the UCM device for MCUs). Assuming the UCM device has identified the MCU, the UCM device can communicate with this MCU to control it so as to add the additional participant/endpoint device to the ongoing conference (i.e., to the conference identified as CONFERENCE1). In a scenario in which the UCM device initially set up the conference session, this UCM device is already aware of the unique bridge identifier and specific conference (i.e., at the point in which the conference is established), such that the additional endpoint device can be connected with the conference based upon the information already available to the UCM device.

An example showing how endpoint device 4 can be added to an existing or ongoing conference session as depicted in FIGS. 3A-3C, where the ongoing conference session includes endpoints devices 1-3 and the bridging for the conference session is provided by MCU 5, is now described with reference to FIGS. 5A-5F and FIG. 6. In particular, FIGS. 5A-5F show a general schematic of the UC platform, but with only endpoint device 1 and endpoint device 4 (the participant to be added), where a UCM device 10 is also shown as the call center for the platform. It is noted that the endpoint devices 1-4 and the UCM device 10 as depicted in FIGS. 3A-3C and FIGS. 5A-5F have the same configuration as the previously described devices depicted in FIG. 2. An example embodiment depicting a flow of messages within dialogs generated between end point devices 1 and 4, the UCM device 10 and the MCU 5 is depicted in FIG. 6. It is understood that an ongoing conference session is already in existence between endpoint devices 1, 2 and 3, where endpoint device 1 initiates a request to add a new participant at endpoint device 4.

Figure 5A:
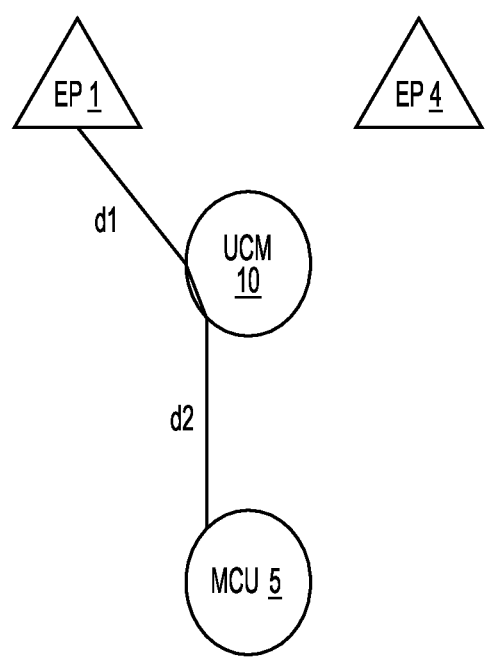
FIGS. 5A-5F are schematic diagrams depicting an example system architecture for adding a new participant to an existing conference session in which each end point/user device utilizes the same unified communications manager.
Figure 5B:
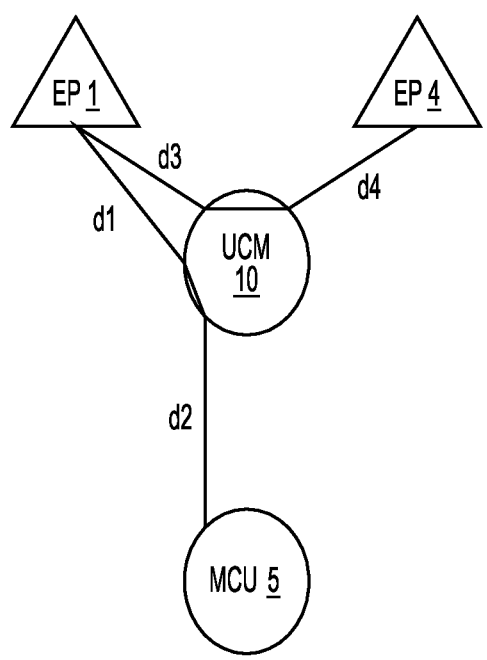
Figure 5C:
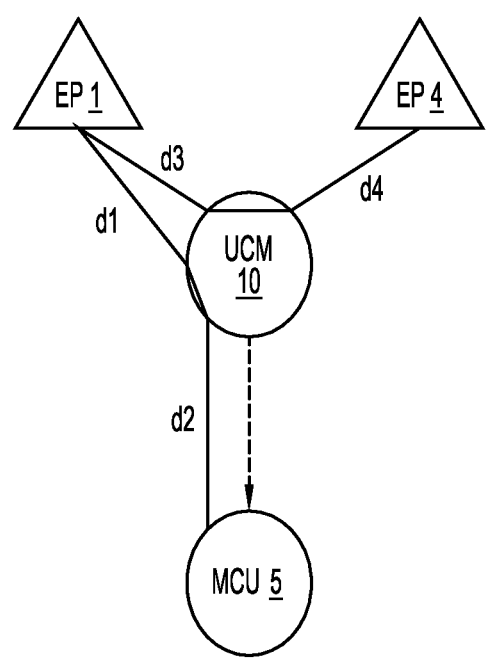
Figure 5D:
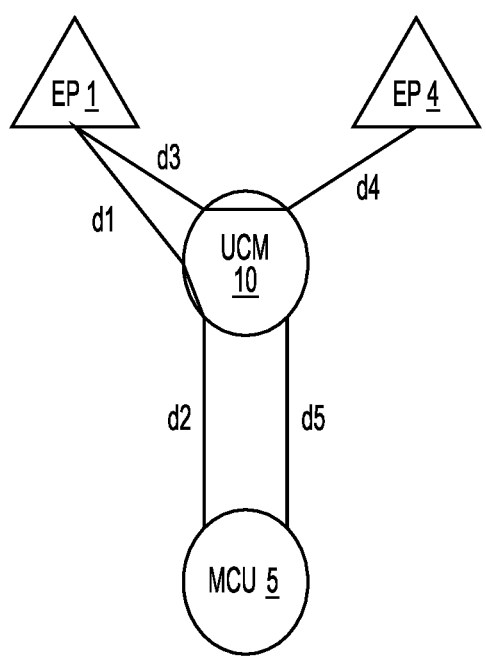
Figure 5E:
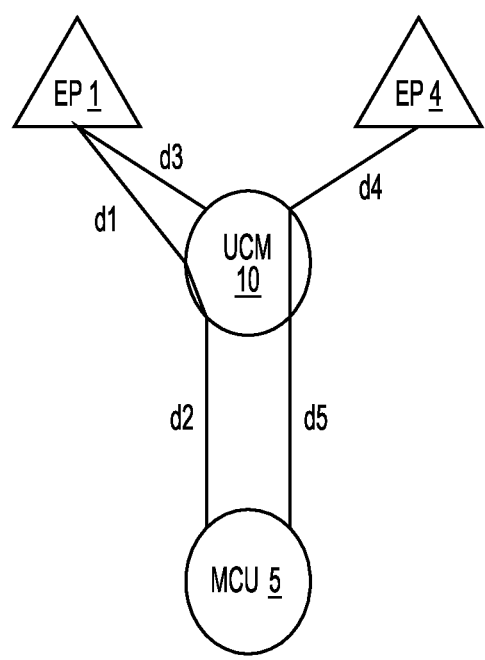
Figure 5F:
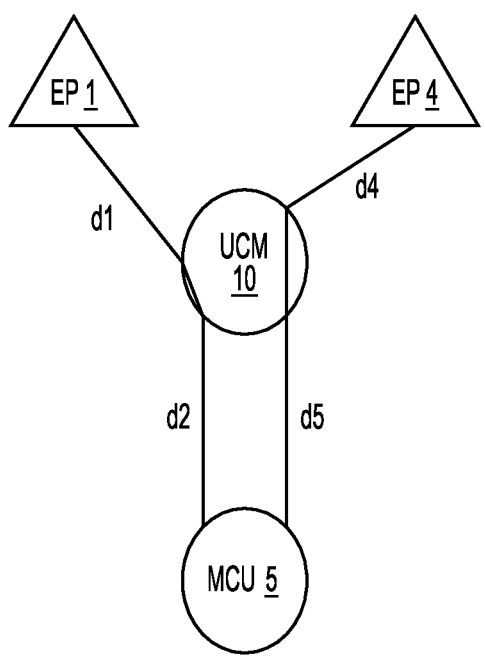
Figure 6:
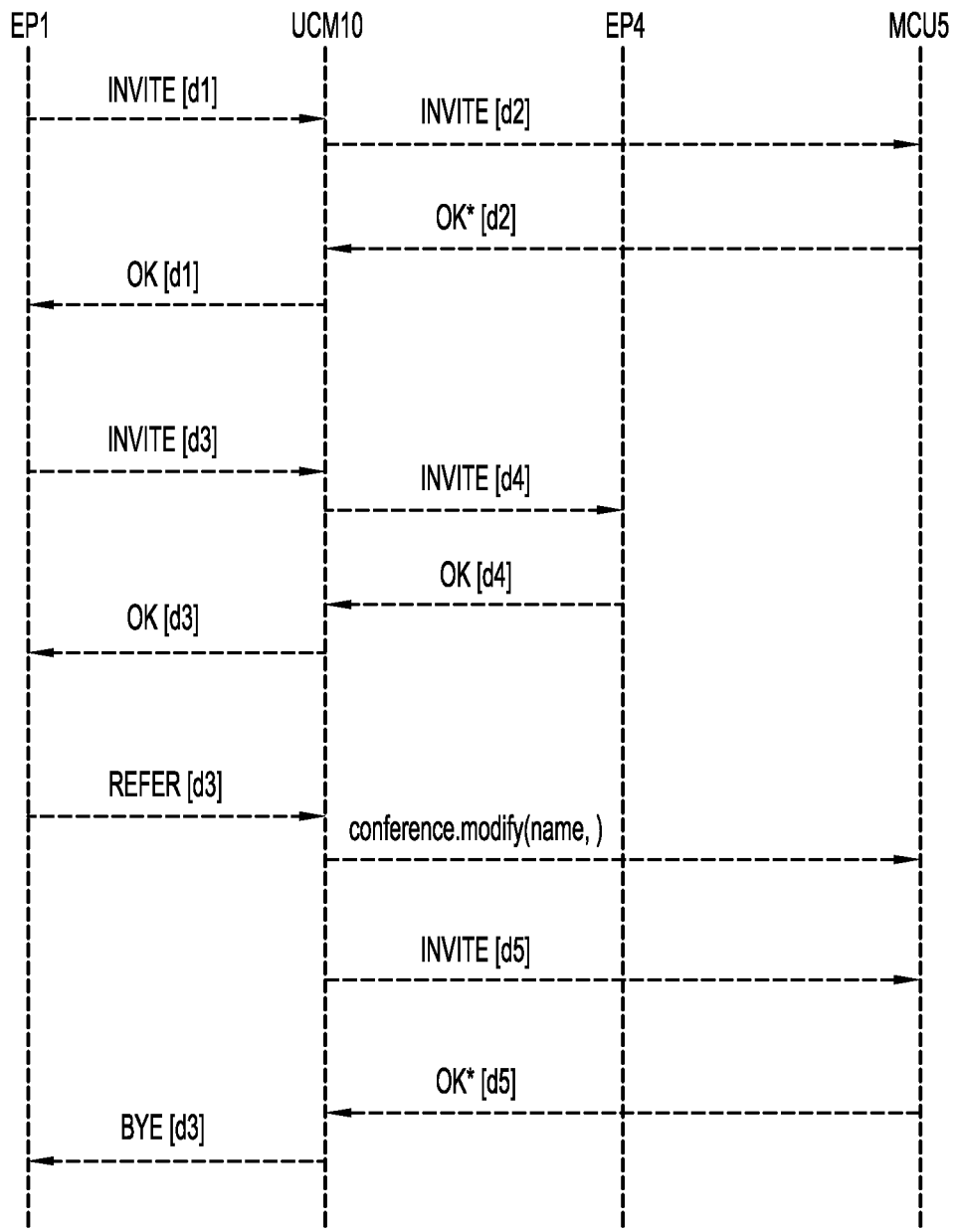
FIG. 6 is a diagram showing a flow of communication messages within dialogs generated between end point/user devices, the unified communications manager and the multipoint control unit for the system architecture as depicted in FIGS. 5A-5F.
Figure 9:
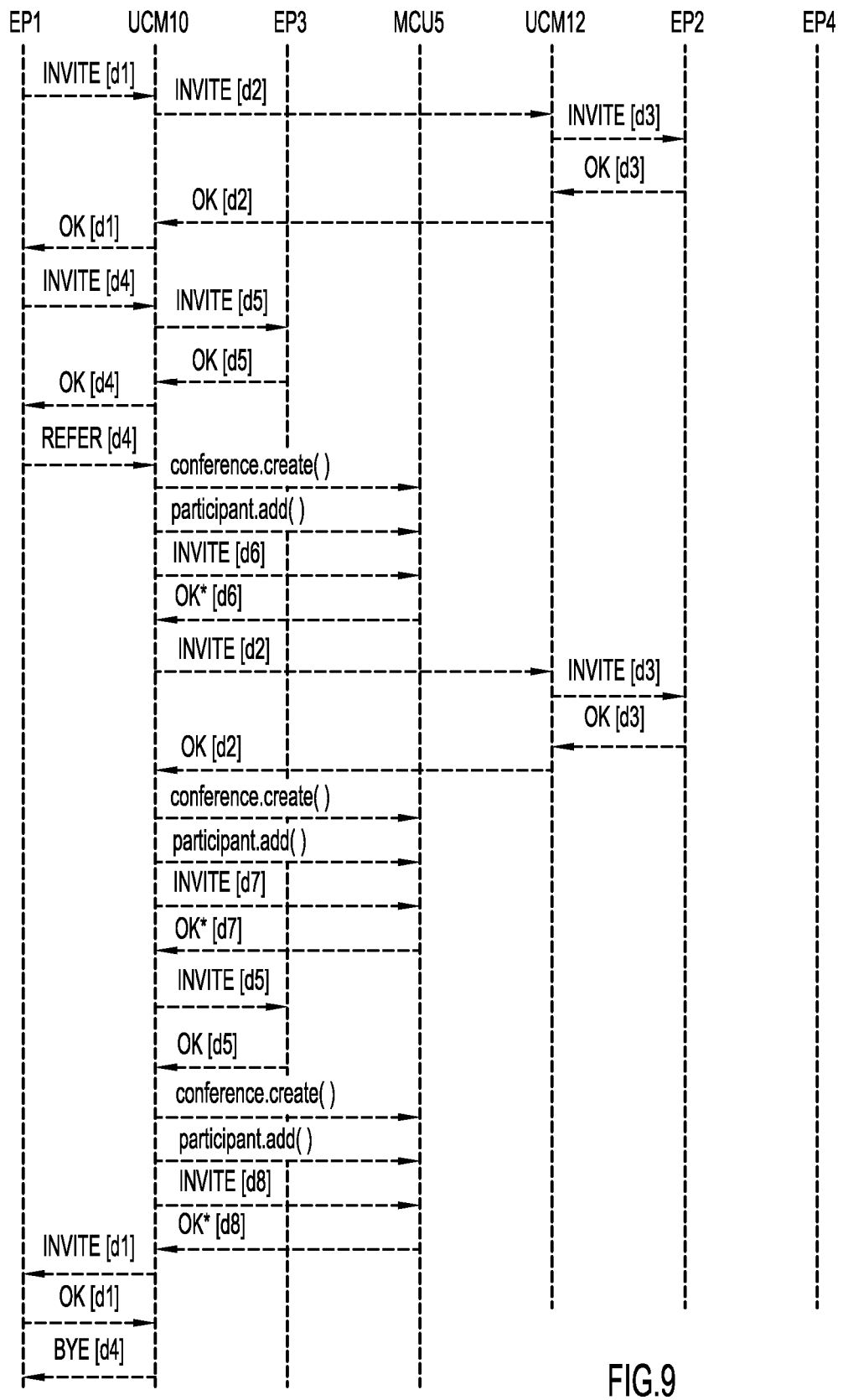
FIGS. 9 and 10 are diagrams showing a flow of communication messages within dialogs generated between end point/user devices, the unified communications managers and the multipoint control unit for the system of FIGS. 8A-8J.
Figure 10:
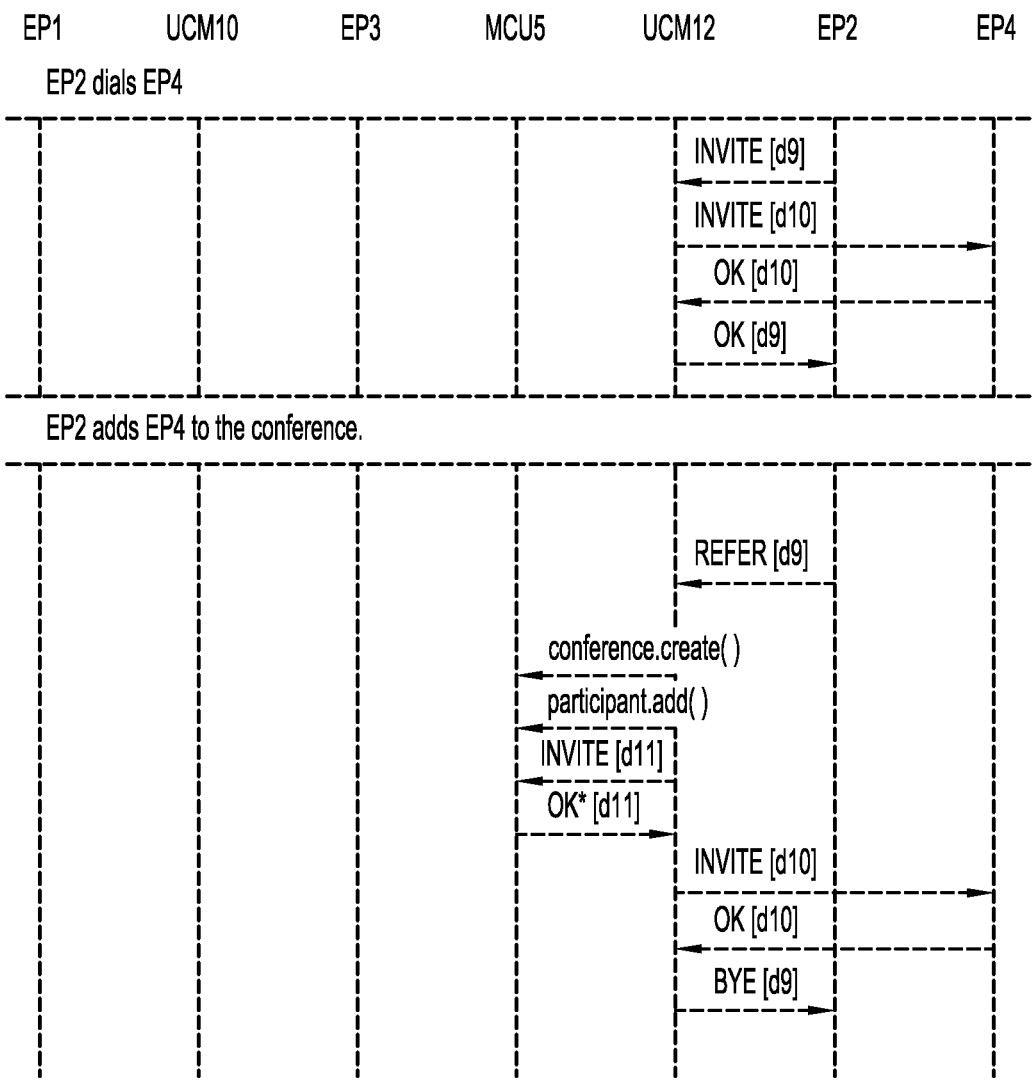

Referring to FIGS. 5A-5F and FIG. 6, initially a connection within an ongoing conference session is established between endpoint 1 and other endpoints (e.g., endpoints 2 and 3, as shown in FIGS. 3A-3C) based upon an invite message sent by endpoint device 1 via the UCM device 10 to the bridge conference session handled by the MCU 5 (within dialogs d1 and d2, as shown in FIG. 5A, also shown as INVITE messages in FIG. 6), where the MCU 5 provides an acceptance of the call in a return message to the UCM device 10 and endpoint device 1 (return messages within dialogs d2 and d1, shown as OK messages in FIG. 6) establishing the connection. The return message can also include additional parameters associated with the conference session, including the unique bridge identifier and unique conference identifier information in the contact header of the message. A call occurs between endpoint device 1 and endpoint device 4, where the call may originate from endpoint device 1 (e.g., to request the participant at endpoint device 4 to join the ongoing conference session) or, alternatively, from endpoint device 4 (e.g., endpoint device 4 calls endpoint device 1 while endpoint device 1 is in the ongoing conference session). As shown in the flow diagram of communication messages in FIG. 6, a call is established between endpoint device 1 and endpoint device 4 by endpoint device 1 sending an invite message, via UCM device 10, to endpoint device 4 (within dialogs d3 and d4, as shown in FIG. 5B). The endpoint device 4 provides a return message, via UCM device 10, to endpoint device 1 (return messages within dialogs d4 and d3) indicating acceptance of the call. A conference key is pressed by the participant at endpoint device 1 to instruct the UCM device 10 to add this participant to the conference (FIG. 5C, also shown as the REFER message in FIG. 6), and the UCM device 10 retrieves the unique bridge identifier and conference identifier and sends a request to the MCU 5 to modify the specific conference associated with the conference identifier. An invite message (within dialog d5, as shown in FIG. 5D) is sent by the UCM device 10 to the MCU 5, and an acceptance (return message within dialog d5) is sent with the additional contact header parameters to the UCM device 10. After receiving the acceptance from the MCU 5, the UCM device 10 ends the original dialog (dialog 3) with endpoint device 1, and endpoint device 4 is connected (via dialogs d4 and d5, as shown in FIGS. 5E and 5F) to the ongoing conference and without creating and chaining of additional bridges to achieve such connection. In an alternative embodiment, the UCM device 10 can instruct the MCU 5 to send an invite message back to the UCM device 10 in order to create dialog 5 and facilitate a connection between endpoint device 4 and the ongoing conference session. Another example embodiment for adding a new participant to an ongoing UC conference session is now described with reference to FIGS. 7-10, including the initial creation of a conference session between three endpoints utilizing two UCM devices and the subsequent addition of a fourth endpoint device to the ongoing conference session utilizing the same MCU. As depicted in FIGS. 8A-8J, endpoint devices 1 and 3 utilize the same UCM device 10 to facilitate these endpoint devices engaging in the UC conference session (e.g., an audio and/or video conferencing session) as well as other operations utilizing a UC platform hosted by UCM device 10, while endpoint device 2 utilizes UCM device 12 to facilitate engagement of this endpoint device in the UC conference session as well as other operations within a UC platform. The generation of dialogs and flow of messages between end points, the UCM devices and the MCU is depicted in FIGS. 9 and 10.

Figure 7:
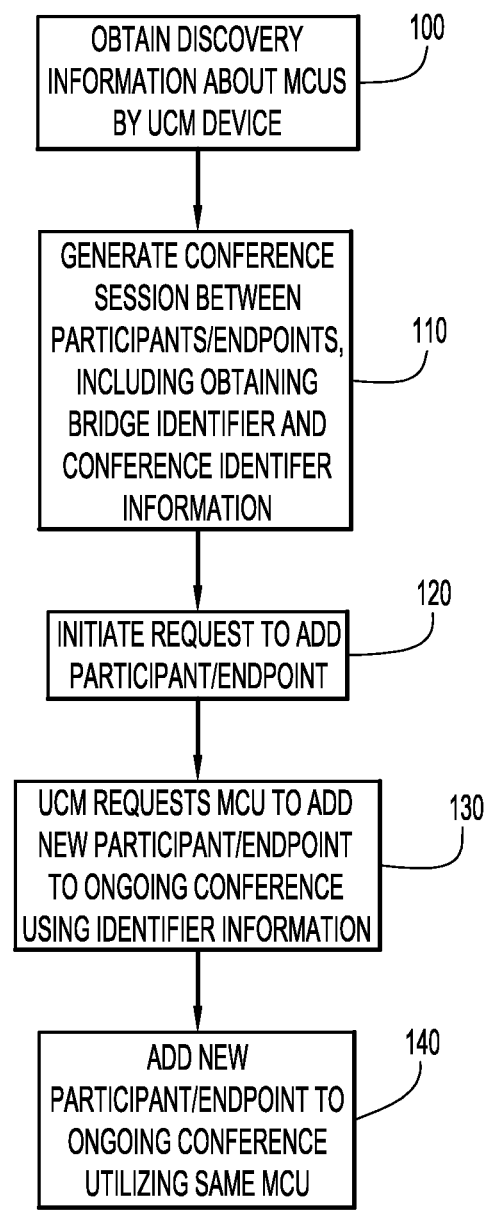
FIG. 7 is a flow chart depicting an example process for connecting a new participant at an end point/user device with other participants engaging in an existing conference session.

Referring to the flowchart in FIG. 7, at 100, discovery information about MCUs is initially obtained by one or more UCMs associated with the conference session (e.g., information such as that previously described and shown in the bridge identifier table of information for different MCUs). At 110, a conference session is initially generated between endpoint devices 1, 2 and 3. This can be achieved, e.g., by endpoint device 1 (shown in FIGS. 8A-8J) first calling endpoint device 2, then putting endpoint device 2 on hold and calling endpoint device 3, followed by conferencing all endpoint devices together in the same communication session (e.g., using a conference key function at the endpoint device 1). Alternatively, the conference session can be initiated by each endpoint device 1, 2 or 3 calling into the UCM device 10 using the same conference identifier information. Referring to FIG. 9 and FIGS. 8A-8F (which describes an example embodiment of a flow of messages to initially establish the conference session), an invite message is sent in dialog d1 from endpoint device 1 to UCM device 10 to connect with endpoint device 2. The invite message is conveyed from UCM device 10 to UCM device 12 via dialog d2, and then from UCM 12 to endpoint device 2 via dialog d3 (see FIG. 8A). The endpoint device 2 returns an acceptance message back to endpoint device 1, via UCM devices 12 and 10 (i.e., via dialogs d3, d2 and d1) to establish the call between these two endpoint devices.

Figure 8A:
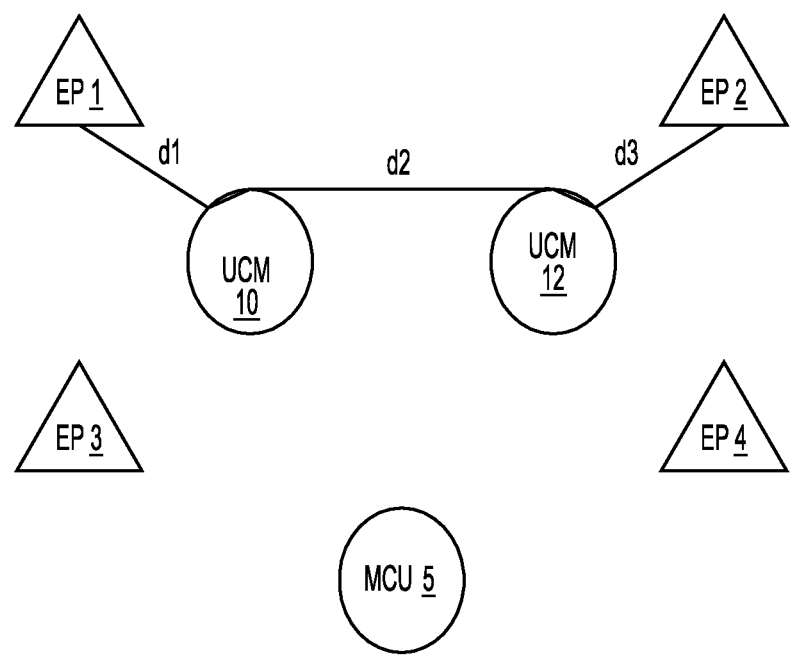
FIGS. 8A-8J are schematic diagrams depicting an example system architecture for adding a new participant to an existing conference session in which end points/user devices utilize two or more unified communications managers.
Figure 8B:
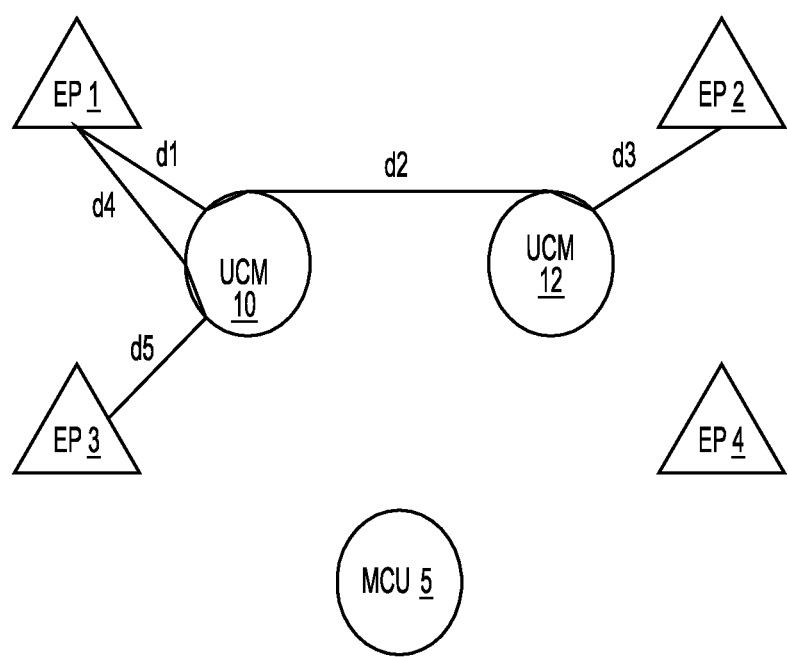
Figure 8C:
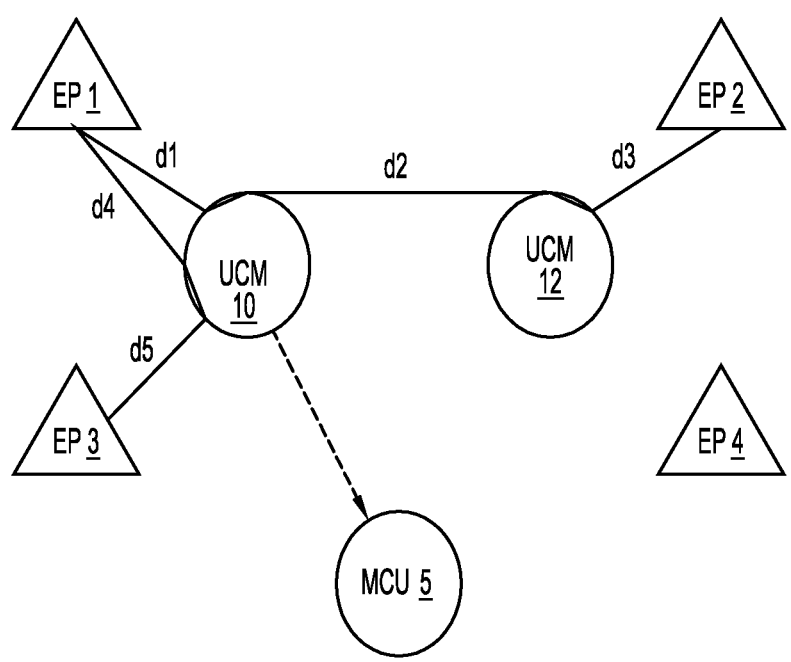
Figure 8D:
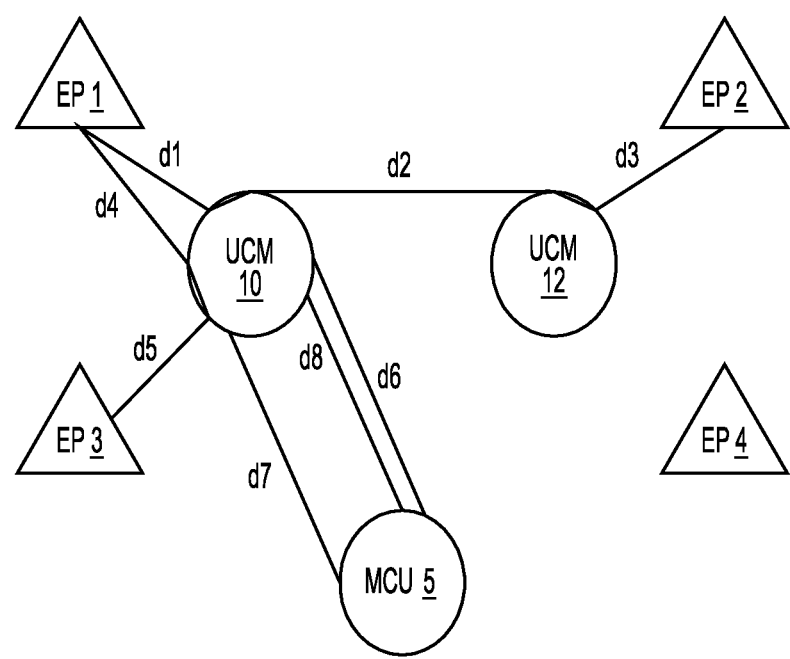
Figure 8E:
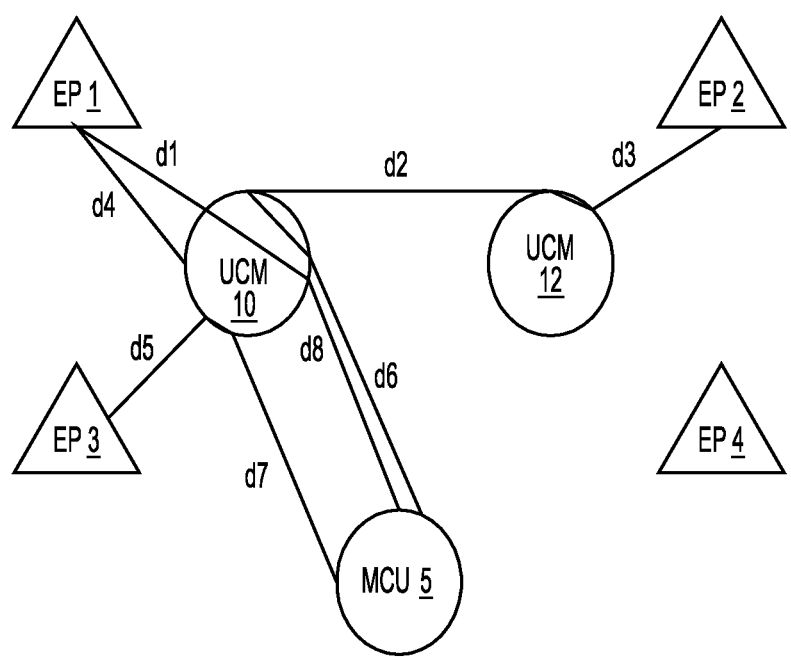
Figure 8F:
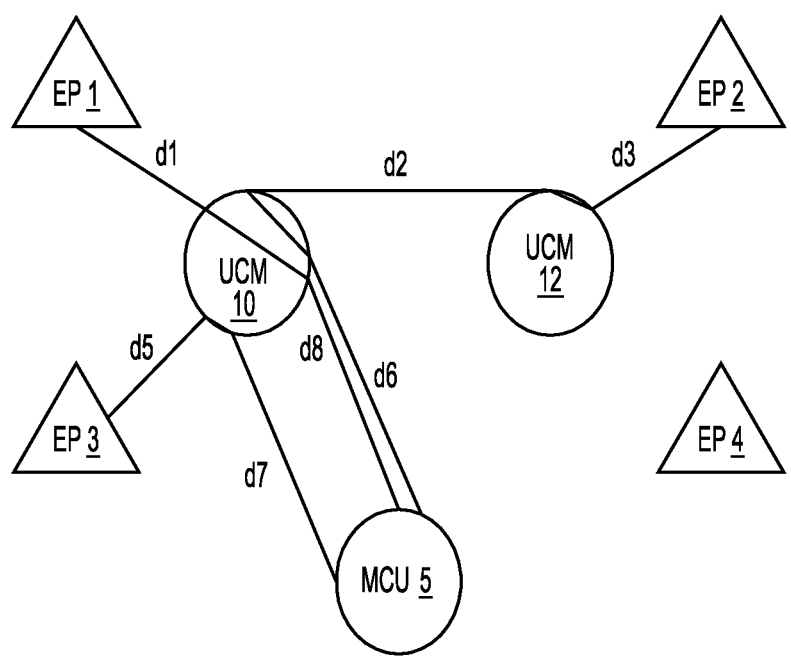

Next, endpoint device 1 sends an invite message, via dialogs d4 and d5, to endpoint device 3 (where endpoint device 3 utilizes the same UCM device 10 as endpoint device 1, as depicted in FIG. 8B). An acceptance message is sent from endpoint device 3 back through dialogs d5 and d4 (and via UCM device 10) to endpoint device 1. A three-way conference session is initiated by endpoint device 1 (e.g., by utilizing a conference key function at endpoint device 1), where a message is sent from endpoint device 1, via dialog d4 (REFER message in FIG. 9), to UCM device 10 in order to create a conference (see FIG. 8C, including a dashed arrow to indicate initiation of the conference session). Conference creation and participant addition messages are sent along with an invite message via a dialog d6 from UCM device 10 to MCU 5 for inviting endpoint device 3 to join the conference session (see FIG. 8D). A return message indicating acceptance is provided from MCU 5 to UCM device 10 via dialog d6 for endpoint device 3 to be joined in the conference session. Bridge and conference identifier information can be passed between an MCU and a UCM device during this connection. Similarly, conference creation and participant addition messages are sent along with an invite message via dialogs d2 and d3 from UCM device 10 to UCM device 12 and endpoint device 2, with acceptance messages returned to UCM device 10 via dialogs d3 and d2. Conference creation and participant addition messages are sent along with an invite message via a dialog d7 from UCM device 10 to the MCU 5, and an acceptance is returned via dialog d7 from the MCU 5 to the UCM device 10 (FIG. 8D). The UCM device 10 sends an invite message via dialog 5 to endpoint device 3, and a message of acceptance is returned. Conference creation and participant addition messages are also sent along with an invite message via dialog 8 between UCM device 10 and MCU 5 for conferencing endpoint devices 1 and 2 into the conference session with endpoint device 3, and a message of acceptance is returned (FIG. 8D). The conference invite message is then sent via dialog d1 from UCM device 10 to endpoint device 1, and an acceptance message is returned. The UCM device 10 splits the connection between dialog d4 and dialog d5 and joins dialogs d5 and d7, as well as splitting the connection between dialog d1 and d2 and making a connection between dialog d1 and d8 and dialog d2 and d6 (see FIG. 8E). A conference session is now established between endpoint devices 1, 2 and 3, which is enabled using MCU 5. The dialog d4, which was previously used in the initial call connection from endpoint device 1 to endpoint device 3 via UCM device 10, is no longer needed and is thus terminated (since endpoint device 3 is now connected in the conference session with endpoint devices 1 and 2 via the joining of dialogs d5 and d7, see FIG. 8F).

Figure 8G:
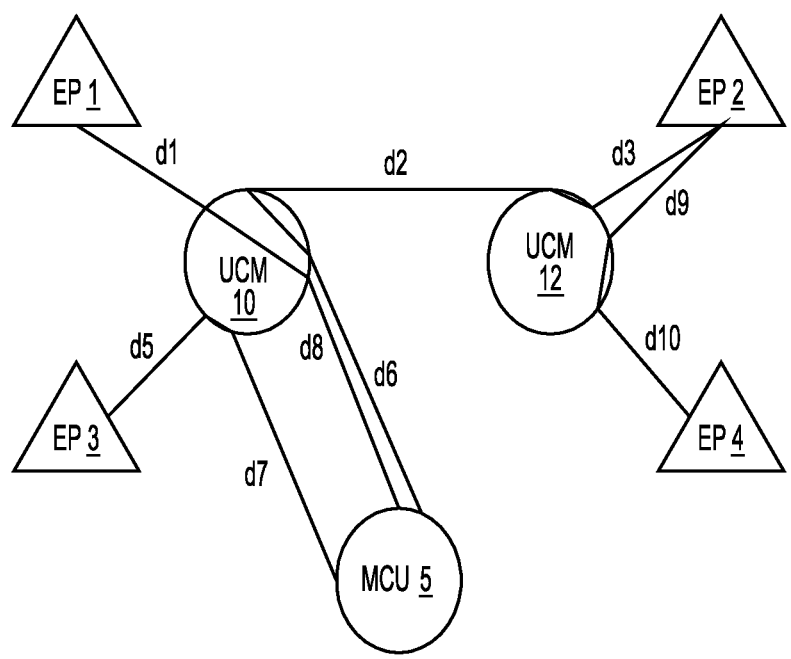
Figure 8H:
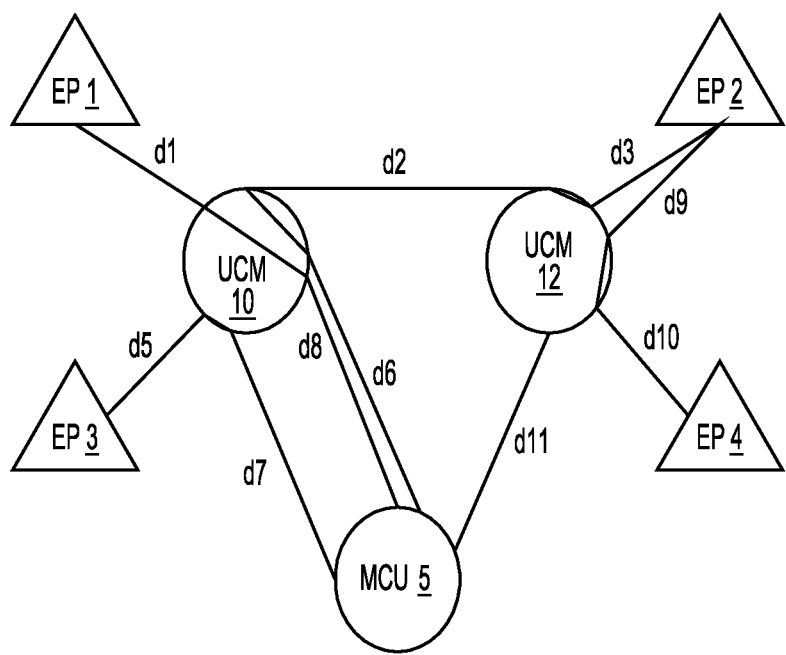
Figure 8I:
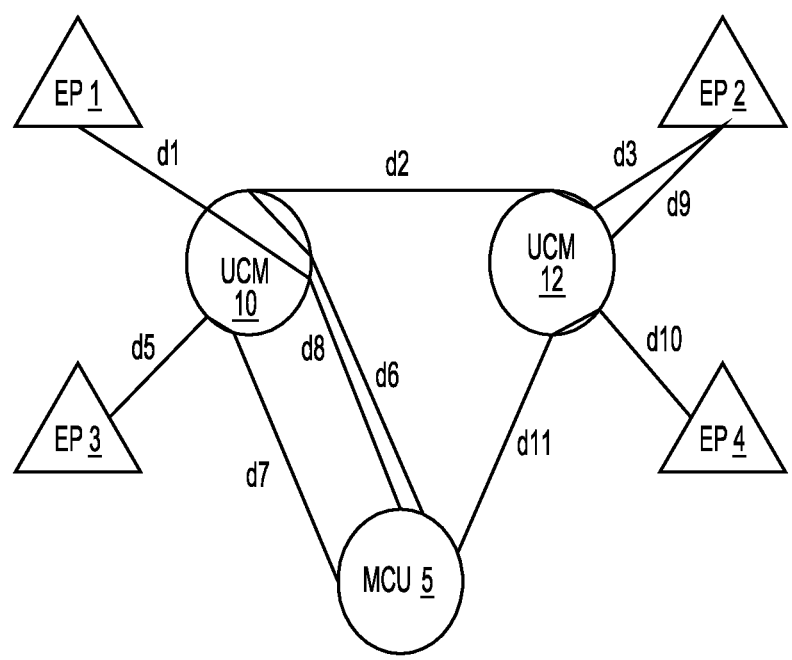
Figure 8J:
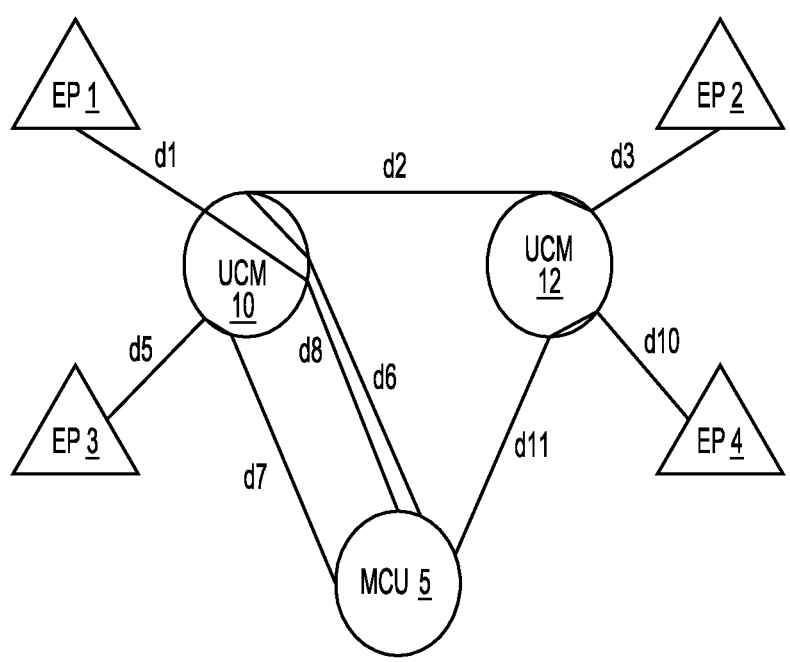

During the ongoing UC conference session, an endpoint device, such as endpoint device 2, may decide to add another participant/endpoint device 4 to the session. The endpoint device 4 utilizes the same UCM device 12 as endpoint device 2 to facilitate engagement of the endpoint device in the UC conference session. A request to add another participant/endpoint device is initiated at 120. For example, endpoint device 2 initiates the addition of another participant by putting the existing conference session on hold at the endpoint device 2 and then calling endpoint device 4. Referring to FIG. 10, endpoint device 2 sends an invite message, via a dialog d9, to UCM device 12, and the UCM device 12 sends the invite message via dialog d10 to endpoint device 4. An acceptance message is returned from endpoint device 4 to endpoint device 2 via dialogs d10 and d9, thus connecting the endpoint devices 2, 4 in a communication session (FIG. 8G). In an alternative embodiment, endpoint device 4 might be the initiator of establishing a connection with endpoint 2 via dialogs d9 and d10 (where the participant at endpoint device 2 then requests the participant at endpoint device 4 to join the ongoing conference session).

The endpoint device 2 next requests addition of endpoint device 4 into the ongoing conference session with endpoint devices 1 and 3 by sending a message, via dialog d9, to the UCM device 12. As previously noted, the UCM device 12 is provided with bridge identifier and conference identifier information during the creation of the conference session. The UCM device 12 can utilize this information to add new endpoint device 4 to the conference session.

In an alternative example embodiment, the bridge identifier and conference identifier information can also be provided in the contact header of any request message to the UCM device 12 (e.g., in a message sent by endpoint device 2 to the UCM device 12). The UCM device 12 can utilize this information to match it with known, stored identification information for MCUs by the UCM device 12 in order to determine which MCU to request adding the additional endpoint 4 to the ongoing conference session.

At 130, the UCM device 12 sends a request to the appropriate MCU for the addition of the new participant at endpoint device 4 to the ongoing conference as well as the identifier of the conference to which the endpoint device 4 is to be added. The UCM device 12 sends conference modify and participant add messages as well as an invite message using dialog 11 to the MCU 5 requesting the addition of end point device 4 to the ongoing conference session (see FIG. 8H). An acceptance message is sent from the MCU 5 via dialog 11 to the UCM device 12. An invite message is sent from the UCM device 12 via dialog 10 to the endpoint device 4, and an acceptance message is returned. The UCM device 12 splits the connection between dialogs d9 and d10 and joins dialogs d10 and d11 (See FIG. 8I), thus resulting in the addition of the new participant at the endpoint device 4 to the ongoing conference session using the same MCU 5 (at 140). Dialog d9 can then be terminated (see FIG. 8J).

The embodiment described and depicted in FIGS. 8A-8J includes features of the conference being initiated by one UCM device 10 to bridge endpoint devices 1, 2 and 3 into a conference using MCU 5, while another UCM device 12 is used to conference the new participant at endpoint device 4 into the ongoing conference using the same MCU 5. In another scenario, a further endpoint device could also be added to the ongoing conference session utilizing either UCM device 10 or UCM device 12. Thus, the techniques described herein can be achieved utilizing any suitable number of UCM devices (e.g., one or more UCM devices) depending upon the locations and configurations of the endpoints involved in the conference session, where one or more UCM devices can be used to initiate the conference session and also add more participants to the ongoing conference session. In addition, while the example embodiments depict one or more UCM devices requesting one or more MCUs to add a new endpoint to a conference session, it is noted that requests can also be made in the other direction, where a UCM device instructs an MCU to send an invite back to the UCM device to facilitate a connection between engaged endpoint devices within an ongoing conference session and a new endpoint device to be added to the ongoing conference session.

Further, any number of additional participants/endpoint devices can be added at any time during an ongoing conference utilizing the techniques described herein. The additional endpoint devices can be added utilizing a single MCU or other suitable bridging device, thus avoiding the creation and chaining of multiple conference sessions together utilizing multiple MCUs.

The above description is intended by way of example only.

What is claimed is:

1. A method comprising:
   establishing an ongoing conference session comprising a communication between a plurality of endpoint devices, wherein a bridging device facilitates a connection between at least some of the endpoint devices engaging in the conference session;
   providing at least one communication message from the bridging device to a communications manager device associated with the conference session, wherein the at least one communication message provides identification information associated with the bridging device and the conference session; and
   in response to a requesting endpoint device engaged in the ongoing conference session requesting to add an additional endpoint device to the ongoing conference session, wherein the requesting endpoint device is further engaged simultaneously in the ongoing conference session and also in at least one of an audio communication and a video communication with the additional endpoint device, extending the ongoing conference session to the additional endpoint device, wherein the additional endpoint device is automatically switched from the at least one of the audio communication and the video communication with the requesting endpoint device to a connection with the ongoing conference session utilizing the bridging device and based upon the conference session information obtained from the at least one communication message.

2. The method of claim 1, wherein the at least one communication message comprises at least one of an Application Program Interface message and a Session Initiation Protocol message including identification information about the bridging device and the conference session within the message.

3. The method of claim 1, further comprising:
   prior to establishing the ongoing conference session, requesting bridging device information by the communications manager device from a plurality of bridging devices including the bridging device that facilitates the connection between at least some of the endpoint devices engaging in the conference session; and
   providing bridging device information from the plurality of bridging devices to the communications manager device in response to the request.

4. The method of claim 3, wherein the bridging device information comprises at least one of a MAC address, a hostname and a serial number for each of the plurality of bridging devices.

5. The method of claim 1, wherein establishing the ongoing conference session further comprises:
   establishing a communication between a first endpoint device and a second endpoint device;
   establishing a communication between the first endpoint device and a third endpoint device; and requesting, via a conferencing feature at the first endpoint device, initiation of the conference session between the first endpoint device and at least the second and third endpoint devices.

6. The method of claim 5, wherein the requesting endpoint device is not the first endpoint device, such that the extending the ongoing conference session to the additional endpoint device is in response to a participant at the requesting endpoint device utilizing a conferencing feature of the requesting endpoint device to request an extension of the ongoing conference session to the additional endpoint device.

7. The method of claim 1, wherein establishing the ongoing conference session further comprises each endpoint device connecting into the conference session based upon known conference session information provided to the endpoint devices.

8. The method of claim 1, wherein at least two endpoint devices are engaged in the ongoing conference session via different communications manager devices.

9. The method of claim 1, wherein extending the ongoing conference session to the additional endpoint device further comprises:
sending a request message from one of the communications manager device and the bridging device to the other of the communications manager device and the bridging device to add the additional endpoint device to the ongoing conference session.

10. An apparatus comprising:
a memory configured to store instructions including one or more software applications that facilitate implementing a conference session between a plurality of endpoint devices; and
a processor configured to execute and control operations of the one or more software applications so as to:
establish an ongoing conference session comprising a communication between the plurality of endpoint devices, wherein a bridging device facilitates a connection between at least some of the endpoint devices engaging in the conference session;
communicate with the bridging device to facilitate receiving at least one communication message from the bridging device, wherein the at least one communication message provides identification information associated with the bridging device and the conference session; and
in response to a requesting endpoint device engaged in the ongoing conference session requesting to add an additional endpoint device to the ongoing conference session, wherein the requesting endpoint device is further engaged simultaneously in the ongoing conference session and also in at least one of an audio communication and a video communication with the additional endpoint device, extend the ongoing conference session to the additional endpoint device, wherein the additional endpoint device is automatically switched from the at least one of the audio communication and the video communication with the requesting endpoint device to a connection with the ongoing conference session utilizing the bridging device and based upon the conference session information obtained from the at least one communication message.

11. The apparatus of claim 10, wherein the processor is further configured to execute and control operations of the one or more software applications so as to communicate with the bridging device to receive at least one communication message comprising at least one of an Application Program Interface message and a Session Initiation Protocol message including identification information about the bridging device and the conference session within the message.

12. The apparatus of claim 10, wherein the processor to execute and control operations of the one or more software applications so as to:
prior to establishing the ongoing conference session, request bridging device information by the communications manager device from a plurality of bridging devices including the bridging device that facilitates the connection between at least some of the endpoint devices engaging in the conference session; and
provide bridging device information from the plurality of bridging devices to the communications manager device in response to the request.

13. The apparatus of claim 12, wherein the bridging device information comprises at least one of a MAC address, a hostname and a serial number for each of the plurality of bridging devices.

14. The apparatus of claim 10, wherein the processor is further configured to execute and control operations of the one or more software applications so as to establish the ongoing conference session by:
establishing a communication between a first endpoint device and a second endpoint device;
establishing a communication between the first endpoint device and a third endpoint device; and
facilitating a request, via a conferencing feature at the first endpoint device, for initiation of the conference session between the first endpoint device and at least the second and third endpoint devices.

15. The apparatus of claim 14, wherein the requesting endpoint device is not the first endpoint device, and the processor is further configured to execute and control operations of the one or more software applications so as to extend the ongoing conference session to the additional endpoint device in response to a participant at the requesting endpoint device utilizing a conferencing feature of the requesting endpoint device to request an extension of the ongoing conference session to the additional endpoint device.

16. The apparatus of claim 10, wherein the processor is further configured to execute and control operations of the the one or more software applications so as to establish the ongoing conference session by each endpoint device connecting into the conference session based upon known conference session information provided to the endpoint devices.

17. The apparatus of claim 10, wherein the processor is further configured to execute and control operations of the the one or more software applications so as to extend the ongoing conference session to the additional endpoint device by one of sending a request message to the bridging device and receiving a request message from the bridging device.

18. One or more computer readable storage devices encoded with software comprising computer executable instructions and when the software is executed operable to:
establish an ongoing conference session comprising a communication between a plurality of endpoint devices, wherein a bridging device facilitates a connection between at least some of the endpoint devices engaging in the conference session;
provide at least one communication message from the bridging device to a communications manager device associated with the conference session, wherein the at least one communication message provides identification information associated with the bridging device and the conference session; and in response to a requesting endpoint device engaged in the ongoing conference session requesting to add an additional endpoint device to the ongoing conference session, wherein the requesting endpoint device is further engaged simultaneously in the ongoing conference session and also in at least one of an audio communication and a video communication with the additional endpoint device, extend the ongoing conference session to the additional endpoint device, wherein the additional endpoint device is automatically switched from the at least one of the audio communication and the video communication with the requesting endpoint device to a connection with the ongoing conference session utilizing the bridging device and based upon the conference session information obtained from the at least one communication message.

19. The one or more computer readable storage devices of claim 18, wherein the instructions are operable to provide the at least one communication message comprising at least one of an Application Program Interface message and a Session Initiation Protocol message including identification information about the bridging device and the conference session within the message.

20. The one or more computer readable storage devices of claim 18, wherein the instructions are further operable to
prior to establishing the ongoing conference session, request bridging device information by the communications manager device from a plurality of bridging devices including the bridging device that facilitates the connection between at least some of the endpoint devices engaging in the conference session; and
provide bridging device information from the plurality of bridging devices to the communications manager device in response to the request.

21. The one or more computer readable storage devices of claim 20, wherein the instructions are operable to provide bridging device information comprising at least one of a MAC address, a hostname and a serial number for each of the plurality of bridging devices.

22. The one or more computer readable storage devices of claim 18, wherein the instructions are operable to establish the ongoing conference session by:
establishing a communication between a first endpoint device and a second endpoint device;
establishing a communication between the first endpoint device and a third endpoint device; and
requesting, via a conferencing feature at the first endpoint device, initiation of the conference session between the first endpoint device and at least the second and third endpoint devices.

23. The one or more computer readable storage devices of claim 22, wherein the requesting endpoint device is not the first endpoint device, such that the instructions are further operable to extend the ongoing conference session to the additional endpoint device in response to a participant at the requesting endpoint device utilizing a conferencing feature of the requesting endpoint device to request an extension of the ongoing conference session to the additional endpoint device.

24. The one or more computer readable storage devices of claim 18, wherein the instructions are further operable to establish the ongoing conference session by connecting each endpoint device connecting into the conference session based upon known conference session information provided to the endpoint devices.

25. The one or more computer readable storage devices of claim 18, wherein the instructions are operable to connect at least two endpoint devices in the ongoing conference session via different communications manager devices.

26. The one or more computer readable storage devices of claim 18, wherein the instructions are further operable to extend the ongoing conference session to the additional endpoint device further by:
sending a request message from one of the communications manager device and the bridging device to the other of the communications manager device and the bridging device to add the additional endpoint device to the ongoing conference session.

* * * * *